United States Patent
Venkatesh et al.

(10) Patent No.: US 7,298,799 B1
(45) Date of Patent: Nov. 20, 2007

(54) ALL-TAP FRACTIONALLY SPACED, SERIAL RAKE COMBINER APPARATUS AND METHOD

(75) Inventors: Narasimhan Venkatesh, Hyderabad (IN); Sankabathula Dharani Naga Sailaja, Vijayawada (IN); Murali Partha Sarathy, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 657 days.

(21) Appl. No.: 10/795,817

(22) Filed: Mar. 8, 2004

(51) Int. Cl.
*H04L 27/06* (2006.01)
(52) U.S. Cl. .................................................... 375/343
(58) Field of Classification Search ................ 375/140, 375/142, 143, 145, 149, 150, 152, 343; 370/390.62, 370/507; 455/265; 702/89; 713/345, 400
See application file for complete search history.

(56) References Cited

U.S. PATENT DOCUMENTS

| | | | |
|---|---|---|---|
| 6,026,115 A | 2/2000 | Higashi et al. | |
| 6,192,066 B1 | 2/2001 | Asanuma | |
| 6,507,604 B1 | 1/2003 | Kuo | |
| 6,529,545 B2 | 3/2003 | Tiirola et al. | |
| 6,556,634 B1 | 4/2003 | Dent | |
| 6,560,488 B1 | 5/2003 | Crawford | |
| 6,614,836 B1 | 9/2003 | Halford et al. | |
| 6,647,077 B1 | 11/2003 | Shan et al. | |
| 6,650,694 B1 | 11/2003 | Brown et al. | |
| 6,661,857 B1 | 12/2003 | Webster et al. | |
| 6,674,740 B1 | 1/2004 | Siala | |
| 2003/0012270 A1* | 1/2003 | Zhou et al. ................. 375/150 |
| 2004/0170238 A1* | 9/2004 | Matsuyama et al. ........ 375/343 |
| 2004/0240486 A1* | 12/2004 | Venkatesh et al. .......... 370/537 |
| 2006/0133456 A1* | 6/2006 | Ettore et al. ................ 375/148 |

OTHER PUBLICATIONS

"Peformance of a Spread Spectrum Rays Reveiver Design" IEEE Second Intl Symposium on Spread Spectrum Techniques & Applications, Nov. 29-Dec. 2, 1992, By Grant, Power & Privilege, Japan.
"A Novel Method of Characterization and Equalization in Spread Spectrum Based WLAN " By Barman & Reddy, Hellosoft, India, http://www.hellosoft.com/products/awlan/papers/:cpwc2002.equalizer.pd.
IEEE STD 802.116—1999, Institute of Electrical & Electronic Engineers, http://www.ieee.org.

* cited by examiner

*Primary Examiner*—Sam K. Ahn
(74) *Attorney, Agent, or Firm*—Jay A. Chesavage; File-EE-Patents.com

(57) ABSTRACT

A decision processor for 802.11b codewords for 1 Mb and 2 Mb data rates includes a sliding correlator for the acquisition of correlation peaks. During a training interval, these correlation peaks are summed into a channel profile memory. The correlation peaks corresponding to a codeword are added into the channel profile memory, and correlation peaks corresponding to the inverse of this codeword are inverted and added into the channel profile memory during the training interval. After the training interval, a decision interval follows whereby correlation peaks are multiplied by the complex conjugate of the contents of the channel profile memory. The multiplication results are accumulated over a codeword window interval to produce a decision output.

105 Claims, 10 Drawing Sheets

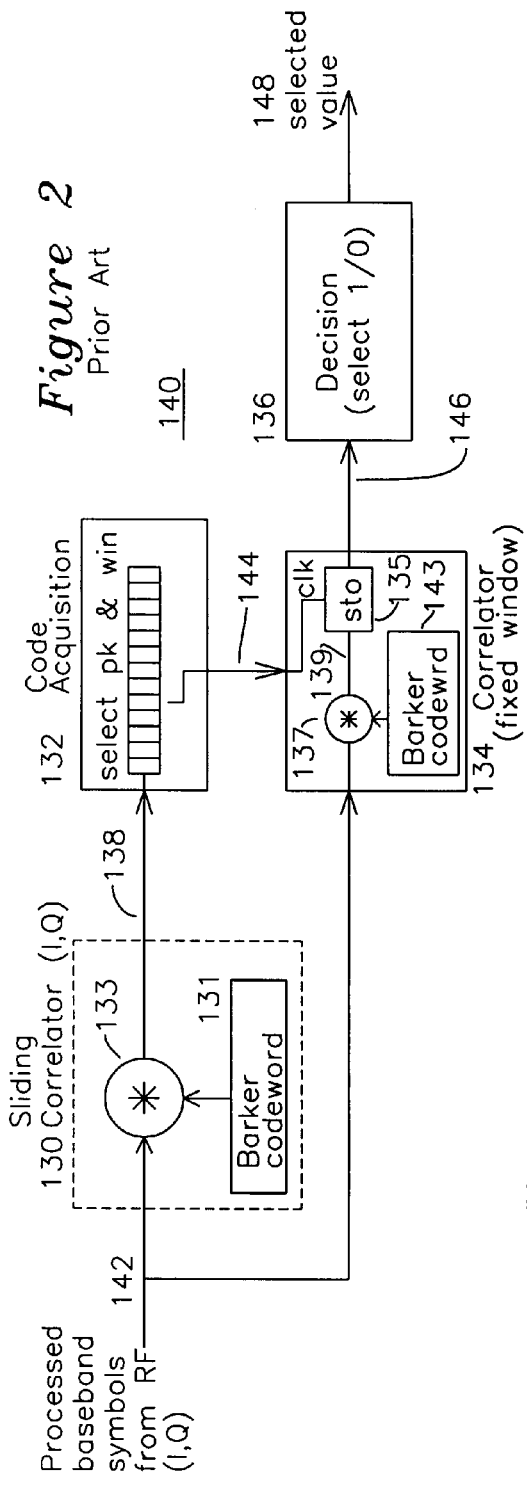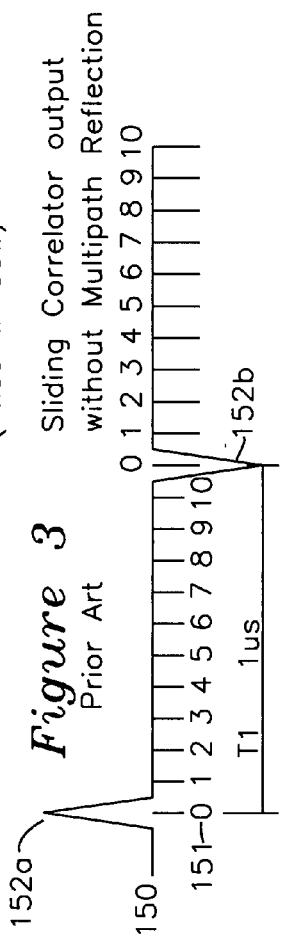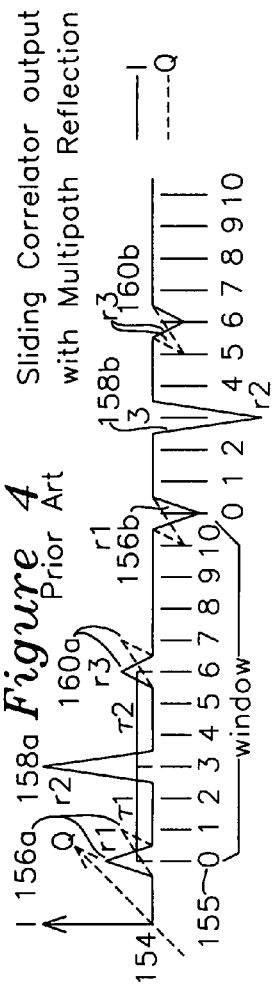
Figure 2 Prior Art
Figure 3 Prior Art
Figure 4 Prior Art Signal with no noise
Prior Art Noise with no signal
Prior Art

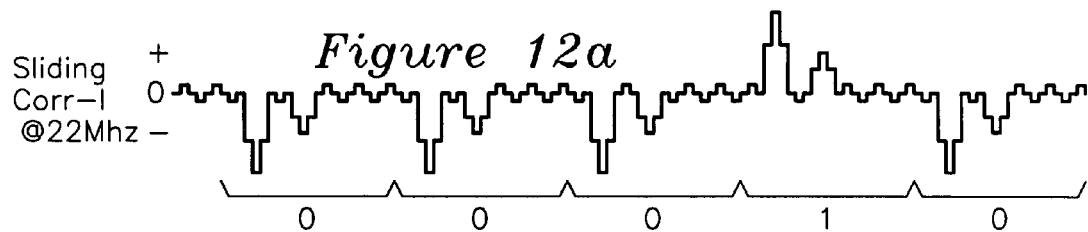
Figure 12a
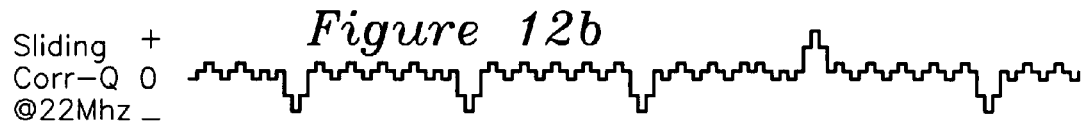
Figure 12b
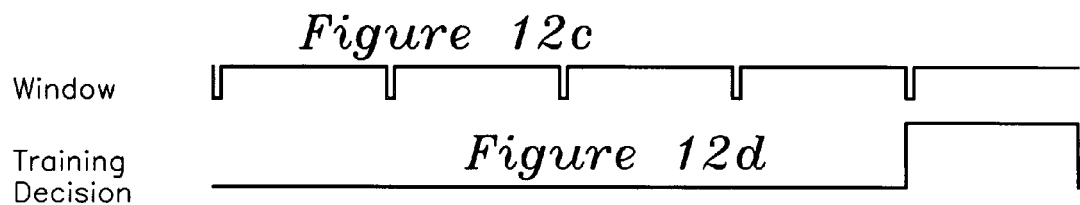
Figure 12c
Figure 12d
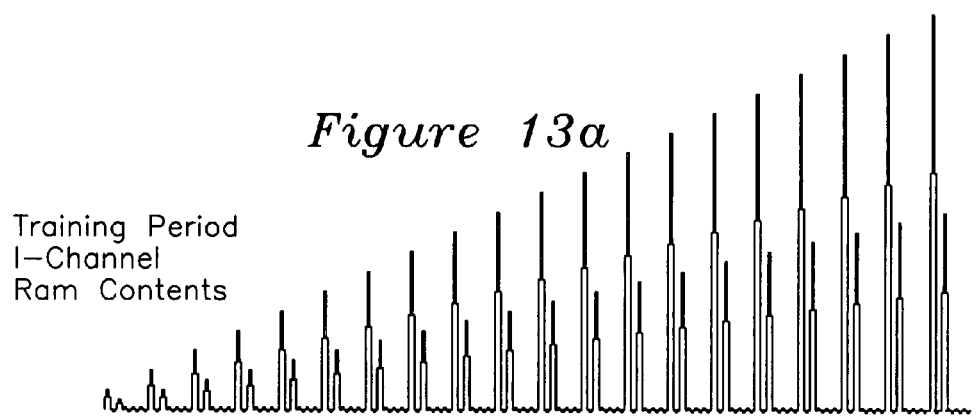
Figure 13a
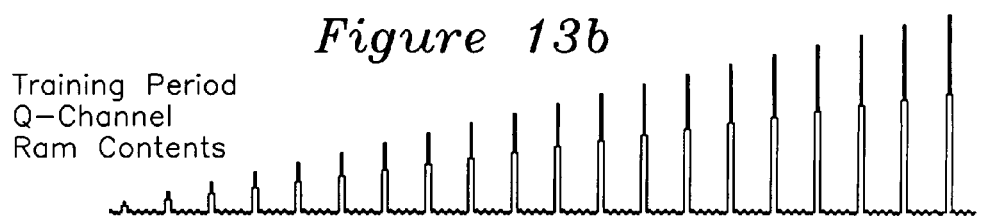
Figure 13b

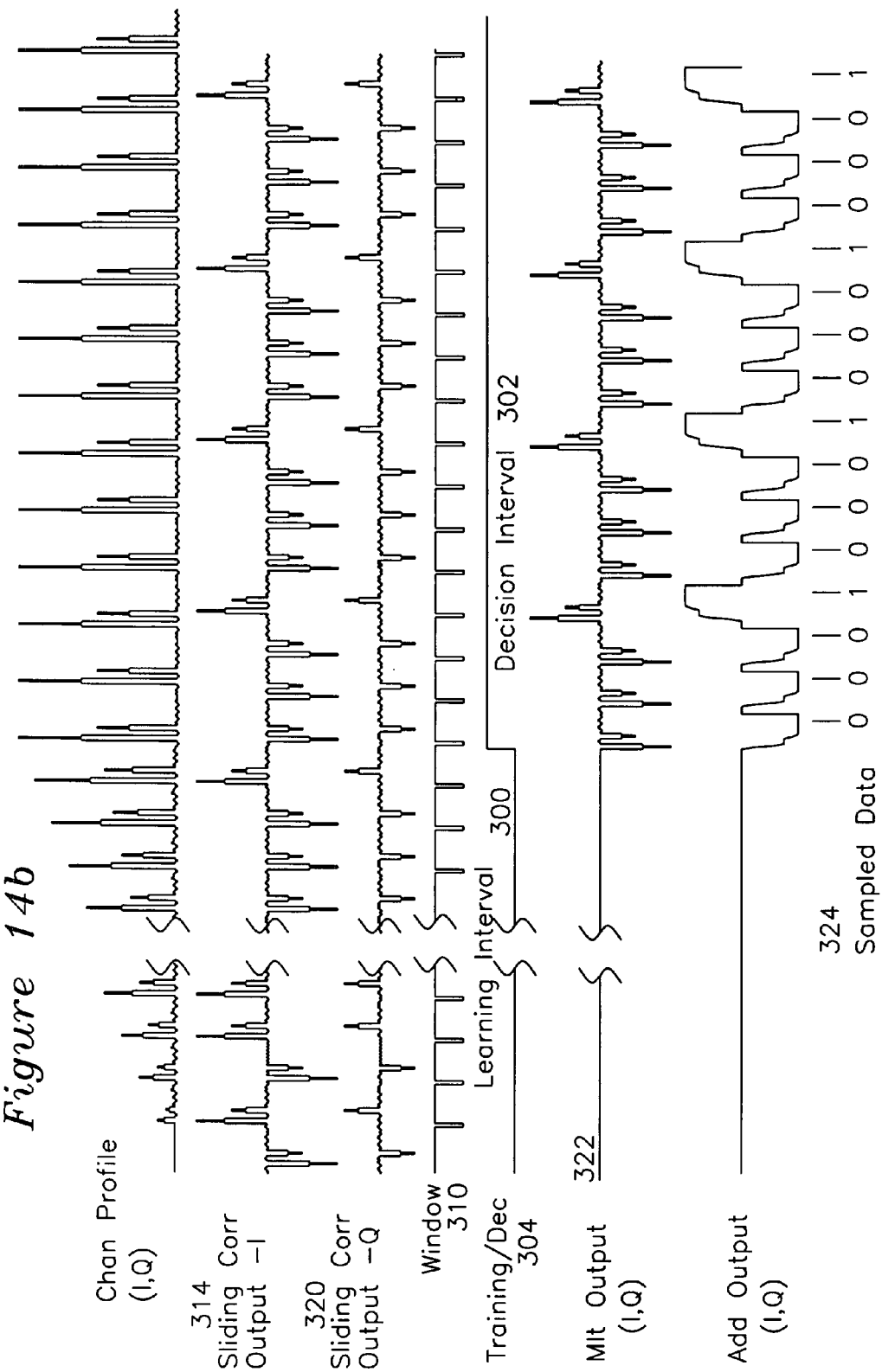

ALL-TAP FRACTIONALLY SPACED, SERIAL RAKE COMBINER APPARATUS AND METHOD

FIELD OF THE INVENTION

The present invention is related to the reduction of multi-path interference in direct sequence spread spectrum (DSSS) signals whereby a primary signal is received along with a plurality of delayed, or reflected, signals. The received symbols may form a codeword, and in the case of spread spectrum IEEE 802.11b 1 Mb and 2 Mb data rates, the codeword may be a Barker codeword for which a decision needs to be made as to whether the codeword for a one (1) or a negative one (−1) was received. In wireless communications systems, the received signal comprises the signal traveling the shortest path accompanied by a plurality of reflected, phase shifted, and later-arriving copies of the original signal. The invention is more specifically directed to spread spectrum wireless communications links such as IEEE 802.11b which operate in the presence of multi-path reflections.

BACKGROUND OF THE INVENTION

Prior art wireless communication systems are defined in IEEE protocols for 802.11b. IEEE 802.11b is an example of a spread spectrum wireless protocol whereby a transmitter emits a typically isotropic or multidirectional transmission of a sequence of baseband codewords translated in frequency to a carrier frequency, where the codewords are phase modulated according to a known sequence, which is referred to as a chipping code. For 1 Mb and 2 Mb IEEE 802.11b data rates, the chipping code is a Barker code, which has the properties of maximum self-correlation and minimum cross-correlation. When a typical IEEE 802.11b receiver is placed within a reception distance from the source, it is common for a plurality of signals to arrive at the receiver. These signals may consist of a first signal which travels a shortest path, followed by a plurality of reflected signals which have path lengths longer than the shortest path. Occasionally, the shortest path will be through an attenuating medium, such that the shortest path does not correspond to the strongest signal. The receiver then must recover this plurality of signals and apply some method of filtering or reconstruction to regenerate the transmitted codeword. One prior art method uses channel sounding, whereby the communications channel is characterized by sending a known signal such as a preamble. Then applying an inverse filter function compensates the channel for the reflections, thereby restoring the channel. The process for generating the inverse filter coefficients such as in a finite impulse response (FIR) filter typically involves identifying the plurality of received signals, applying a delay and a weight to each signal, and performing the signal reconstruction with an FIR filter. Since the coefficients of an FIR filter must be computed from the delays and weights, this may require extensive computation complexity and computation time, and may not be achievable during the short preamble time of the incoming packet, where the coefficients must be computed before the packet data arrives.

FIG. 1 shows a wireless Local Area Network (LAN) operating in a typical office environment, wherein two mobile stations may be transmitting and receiving data through the wireless medium. While both station 100 and station 102 are typically transmitting and receiving wireless signals, for simplicity of analysis, station 100 is shown as a transmitter and station 102 is shown as a receiver. In the figure, receiver 102 receives a first signal from an attenuated path R1 112 r1 114 with an attenuating barrier 106, followed by the next signal with the path length R2 108 and reflection r2 220, followed by the next signal with the path length R3 116 and reflection r3 118. In this figure, a small number of such path reflections are shown, however as a practical matter, an infinite number of such reflection paths exist, shown generally by path $R_n$ 120 and reflected path $r_n$ 222. In the wireless IEEE 802.11b protocol, the use of spread spectrum transmission and reception techniques improves the bit error rate (BER) in the presence of multi-path reflections to the receiver. However, the BER can be greatly reduced if the various reflections ($r_1$ to $r_n$) are used to make a decision at the receiver demodulator, rather than using the strongest (relatively) signal only, ignoring all other multi-path reflections present. Moreover, the absence of a direct path in such communications (as shown by path R1-r1) means that the information is highly dispersed and arrives strongly attenuated and through various path lengths so that the single correlation peak energy is spread out over many correlation peaks arriving at later times. A temporal Maximal Ratio Combiner (MRC) operating on the spread spectrum correlation peaks would give a much higher BER than a simple decision based on a single maximum peak. The combining of signal energy arriving at different times associated with the transmission of data is the basic principle on which the rake combiners for spread spectrum receivers operate. A plurality of weighted delays in the form of a Feed Forward Filter (FFF) is used to cause the various correlation peaks associated with the delayed arrival of a plurality of multipath reflections of a given codeword to recombine into a single peak. Additionally, since the multipath reflections cause the rotation of incoming codeword symbols out of their original quadrature channels, an additional function of the MRC is to apply phase compensation to rotate these symbols back in to the original quadrature channels, so that received signal energy is rotated back into the proper I and Q channels, thereby adding to the signal that is received on the direct path.

FIG. 2 shows a decision block for a direct sequence spread spectrum receiver 140 that includes a sliding correlator 130 which correlates the Barker codeword 131 with the signed incoming quadrature symbol stream 142. The incoming quadrature symbol stream 142 comprises an analytic signal formed by receiver quadrature mixing using the relationship $e^{j\phi(t)} = \cos(\phi(t)) + j^*\sin(\phi(t))$, where the first term represents in-phase (I) information in the real channel and the second term represents quadrature (Q) symbol information in the imaginary channel. Each channel of the incoming symbol stream is digitized using an Analog to Digital Converter into positive and negative values N-bit wide (where N is the width of the converter outputs), where the positive and negative values of the input stream contain Barker codewords:

I channel  1 = {+1, −1, +1, +1, −1, +1, +1, +1, −1, −1, −1};
          0 = {−1, +1, −1, −1, +1, −1, −1, −1, +1, +1, +1}
Q channel  1 = {+j, −j, +j, +j, −j, +j, +j, +j, −j, −j, −j};
          0 = {−j, +j, −j, −j, +j, −j, −j, −j, +j, +j, +j} where the Q channel codewords are simply the I channel codewords multiplied by j. A phase rotator function in the aforementioned receiver digital signal processing causes the symbols to be rotated into the I or Q channels of the correlator input 142.

For an 11 bit Barker code, the soft (N-bit wide) I and Q channels are cross-correlated with the respective Barker codewords for 1. This cross-correlation of the input stream containing Barker codes for 1 produces the impulsive value +11, while the cross correlation of the input stream containing 0 produces the impulsive value −11. In this manner, the cross-correlation of the incoming data against the Barker codewords produces I and Q values which have a peak impulsive positive response for the 1 codeword, a peak impulsive negative response for the 0 codeword, and approximately 0 at all other times. Because of the impulsive nature of the cross correlation response, the incoming quadrature signal 142 is typically presented as an over-sampled signal at twice the bit rate, or 22 Mhz, so that information for compensating timing drift between the transmit and receive DAC and ADC clocks is retained in the digitized signal. Additionally as mentioned above, the incoming quadrature symbol stream is multi-valued rather than binary, so the correlation outputs 138 and 139 are an over-sampled, multi-valued quadrature data stream. The code acquisition function 132 maintains a correlation output history and determines the peak correlation points, which are used to produce a synchronization pulse accompanied by an indication for the start and end of the codeword window. Once codeword acquisition is achieved, the baseband Direct Sequence Spread Spectrum (DSSS) codewords 142 are presented to a simpler fixed window correlator 134, which performs a correlation 137 of the incoming quadrature symbol stream 142 to the Barker codeword 143. The multi-valued quadrature result of this cross correlation output 139 is stored in memory 135 at a synchronization time determined by code acquisition function 132, which presents a pulse at the point of maximum positive or negative signal, as described earlier. Decision block 136 examines the positive or negative value stored in memory 135, and decides whether a Barker codeword for 1 or 0 was received. For a 2 Mb data rate, the fixed window correlator 134 is separately correlating the I and Q streams with the Barker codeword, thereby storing in memory 135 1 bit of decision data from the I and Q stream for each 1 us codeword interval. For a 1 Mbps data rate, the phase encoding is in the I (or Q) channel alone, and the Q (or I) channel contains only correlation and thermal noise. For the 2 Mbps data rate, the number of possibilities double since now the receiver can get (1,0), (−1,0), (0,1) or (0,−1) in each 1 us duration, i.e., 2-bits of information every microsecond. The spread spectrum signal comprises one of the two 11 bit Barker codewords occurring within 1 us boundaries for IEEE 802.11b wireless communication systems. Examining the codeword output 138, the code acquisition function 132 of FIG. 2 stores several windows of samples and extracts a synchronization signal 144. This synchronization pulse and a window signal (shown as timing 151 in FIG. 3) to establish the framing of codewords is sent to the fixed window correlator 134 and to the decision function 136 which determines which chip code is the closest approximation. In direct sequence spread spectrum (DSSS) signals, chip codes that are dependant on the particular 802.11b data rates are used for encoding and decoding. These chip codes are Differential Binary Phase Shift Keying ((D)BPSK) using Barker codes for 1 Mbps, and Differential Quadrature Phase Shift Keying ((D)QPSK) using Barker codes for 2 Mbps. The higher data rates of 5.5 Mb and 11 Mb use Complementary Code Keying (CCK). In the present invention, we are concerned with 1 Mbps and 2 Mbps data rates using 11 bit Barker codes. It is essential that the decision block for a direct sequence spread spectrum receiver 140 of FIG. 2 properly synchronize to the peak and window of the 11 bit codewords, done during the preamble interval of the packet with sliding correlator 130. An unsynchronized stream of incoming codewords 142 is referred to as a symbol stream, and once the synchronization to the 11 bit codewords is accomplished, this is referred to as a codeword stream. The codeword stream is then converted into binary values comprising a data stream 148. Examining the quadrature multi-valued output of the sliding correlator 130, a datum point may be defined as the strongest correlation response of the present symbol. Pre-cursors are signals received prior to the datum point, and post-cursors are signals received after the datum point. The sample window includes pre-cursors, the datum point, post-cursors, and has a duration equal to a symbol length. Directly received signal in the presence of attenuation followed by multi-path reflection produces correlation output 138 which comprises pre-cursors, followed by the strongest correlation response of the present symbol earlier referred to as a datum point, and finally post-cursors representing the multipath reflections. In combination, these signals represent the total signal power available for use by the decision processor. Although received at different times, the sum of these signals in the channel represent the total signal power available. In one prior art receiver, the strongest correlation response is selected for synchronization signal 144 and the pre-cursors and post-cursors are ignored, which results in reduced signal to noise, since the noise level is constant while the signal power associated with the pre-cursor symbols and post-cursor symbols is discarded. It is desired to use a plurality of symbols including pre-cursors and post-cursors to generate a composite signal which uses the pre-cursors and post-cursors so that the signal to noise ratio is improved.

FIG. 3 shows waveform 150 of output 138 of the sliding correlator 130, both from FIG. 2, for a Barker codeword 1 followed by a Barker codeword 0 presented to the input 142 from FIG. 2. In the absence of multi-path reflection or noise, the sliding correlator 130 output 138 would appear as shown in curve 150 of FIG. 3. Every sample time, the incoming symbol stream 142 of Barker codes for 1 followed by 0 is correlated 133 with Barker codeword 131 in the sliding correlator 130, which produces the positive peak 152*a* followed by a negative peak 152*b*. These peaks are detected by code acquisition function 132, which uses an algorithm for defining a window comprising the timing points 0 through 10 151 of FIG. 3, as shown. Once this synchronization is achieved, the timing of the remainder of the Barker codewords may be maintained by the precision of the clock oscillators of the receiver and transmitter. The synchronization signal 144 is applied to fixed window correlator 134, which selects one of two codewords in the I (or Q) channel for a 1 Mb data rate, or one of four codeword combinations in the I and Q channel for a 2 Mb data rate. In the absence of noise or multi-path reflections, the decision block 140 for a direct sequence spread spectrum receiver 140 of FIG. 2 performs well, and the cross correlation of the Barker codeword 131 with the incoming symbol stream produces the correlator output 150 as shown in FIG. 3. In the presence of multi-path reflections, degradation of the cross correlation output 138 occurs. For example, given the signal paths shown in FIG. 1, an attenuated signal traveling path r1 114 followed by a stronger reflected signal r2 220, followed by a weaker reflected signal r3 118 would produce signal 154 comprising the attenuated response r1 156*a*, reflected and phase shifted maximum signal r2 158*a*, and reflected and attenuated signal r3 160*a* respectively as shown in FIG. 4.

The phase rotator (not shown) which performs phase rotation of the incoming signal stream prior to delivery as stream 142 uses maximum level signals as the datum for this phase rotation. In FIG. 4, the phase rotation causes maximum responses 158a and 158b to be rotated in phase until they are aligned in the I channel. Using maximum response only, the code acquisition function 132 could incorrectly determine that r2 158a is code position 0 based on purely amplitude considerations, when the actual synchronization time is r1, as shown by the alignment with the time interval 0 155. FIG. 4 shows the I and Q components of the incoming signal, which have been phase rotated by the phase shifter (not shown), such that the strongest signal 158a has been shifted exclusively into the I channel, and precursor 156a is shifted in phase, as is postcursor reflection 160a, as evidenced by the shifting of energy into the Q channel for 156a and 160a. Similarly, for the 0 symbol, strongest signal 158b is only seen in the I channel, while precursor 156b and postcursor reflection 160b is shifted in phase.

FIG. 5 shows a prior art rake combiner 190 with the rake having three fingers. This allows for improved signal to noise performance and multi-path reflection reduction, and implements a function known as temporal maximal ratio combining (MRC). An MRC identifies a finite number of strongest signals, and combines them to rearrange the signal power of each of the delayed signals into a single signal with maximum power such that there is maximum likelihood of decoding the signal correctly. In FIG. 5, the baseband signal stream 194 is comprised of the FIG. 4 signals r1 156a, r2 158a occurring $\tau 1$ later, and r3 160a occurring $\tau 2$ thereafter. The code acquisition 162 generates a synchronization pulse 196 from the output of the sliding correlator 192, similar to sliding correlator 130 of FIG. 2, but delayed by $\tau 1+\tau 2$. The baseband symbol stream 194 is provided to correlator 168, and the same signal is provided to correlator 166 delayed by $\tau 2$, and to correlator 164 delayed by $\tau 1+\tau 2$. In this manner, at the instant of synchronization pulse 196, correlator 164 is providing signal associated with r1 in FIG. 4, correlator 166 is providing signal associated with r2 in FIG. 4, and correlator 168 is providing signal associated with r3 in FIG. 4. These signals are multiplied by a conjugated series of complex coefficients $\alpha 0$, $\alpha 1$, and $\alpha 2$, respectively. The conjugated complex coefficients $\alpha 0$ 174, $\alpha 1$ 176, and $\alpha 2$ 178 are a linear array of complex numbers with a length equal to the length of the incoming signal stream window, repeated continuously, as it known to one skilled in the art of finite impulse response filters operating on periodic signals. The correlators 164, 166 and 168 are multiplied by the complex conjugate of the linear array of conjugated complex coefficients $\alpha 0$ 174, $\alpha 1$ 176, and $\alpha 2$ 178, respectively. The conjugated complex coefficients $\alpha 0$ 174, $\alpha 1$ 176, and $\alpha 2$ 178 reverses the sign of the imaginary part of the coefficient. For example, the complex conjugate of (a+jb) is (a−jb), and vice-versa. Multiplying a value by its complex conjugate has the effect of converting all of the signals in the imaginary channel into the real channel. The complex multi-valued outputs of multipliers 180, 182, and 184 are summed respectively by adder 186, and provided to decision block 188, which performs in the same manner as decision block 136 of FIG. 2.

FIG. 6 shows a maximal ratio combiner processor 201, where the signals and later reflections are delayed and multiplied by a linear array of conjugated complex coefficients $\alpha 0$ 208, $\alpha 1$ 210, and $\alpha 2$ 212, then summed to form a signal containing maximum combined signal power. Similarly to the rake combining signal processing system of FIG. 5, the function of the MRC processor 201 is to delay pre-cursor signal 156a of FIG. 4 with delay element 204 and to delay the strongest symbol 158a of FIG. 4 with delay element 206 such that these signals align in time with post-cursor 160b of FIG. 4. The MRC processor 201 then multiplies each stream of pre-cursors, the strongest signal, and post-cursors separately with a linear array of conjugated complex coefficients $\alpha 0$ 208, $\alpha 1$ 210, and $\alpha 2$ 212, respectively, and then sums the aligned and multiplied streams in adder 220, thereby producing reflection-compensated output 228. This reflection-compensated output 228 is then fed to correlator 222, which is gated by synchronization pulse 226 similar to synchronization pulse 196 in FIG. 5. The effect of multiplying by the conjugated complex coefficients $\alpha 0$ 208, $\alpha 1$ 210, and $\alpha 2$ 212 is the phase rotation of reflected multi-path signals back into the proper channel. For both of the maximal ratio combiners in FIGS. 5 and 6, the computation of delay coefficients for delay elements 170 and 172 of FIG. 5, delay elements 204 and 206 of FIG. 6, as well as the linear arrays of conjugated complex coefficients $\alpha 0$ 174, $\alpha 1$ 176, and $\alpha 2$ 178 in FIG. 5, and the linear arrays of conjugated complex coefficients $\alpha 0$ 208, $\alpha 1$ 210, and $\alpha 2$ 212 in FIG. 6, are done based on the strongest correlation signals. These conjugated complex coefficients must be computed based on the amplitude and the phase of the particular pre-cursors and post-cursors present, which depends upon the nature of multipath present.

FIG. 7 shows the waveform for time-shifted cross correlation (normalized so that peak is one) for the 256 possible complementary code keying (CCK) codewords used in the 11 Mbps data rate of IEEE 802.11b wireless communication systems. It can be seen that the cross-correlation response (with time shifts of +/−7 symbols) of up to 0.4 times the peak (autocorrelation) rules out any major multipath tolerance of a system using the autocorrelation properties of CCK codewords to do an MRC combining. This has the additional implication that the maximal ratio combiner 201 of FIG. 6 could be placed in the signal processing stream for both the Barker and CCK codewords. This would not be possible with the rake combining signal processing system 190 of FIG. 5, since the multiplication and summing is done post-correlation. But FIG. 7 shows the CCK codeword response for cross-correlation is poor and hence any system relying on such an MRC combining for multipath tolerance would fail for the CCK rates under multipath.

FIG. 8 shows a waveform for the sliding correlation output for Barker codewords. The figure shows the 1 us timing and response of a noise-free signal presented to a sliding correlator operating at twice the bit rate, or 22 Mhz. FIG. 9 shows the waveform for the sliding correlation output for noise input—noise that would ordinarily be present with the signal of FIG. 8.

OBJECTS OF THE INVENTION

A first object of the invention is a system for maximum ratio combining whereby a sliding correlator provides window and synchronization information which is used to generate a training decision signal which is then used to invert the received codewords for 0 and not invert codewords for 1, and to sum these with the contents of a channel profile memory.

A second object of the invention is to use the values stored in a channel profile memory by synchronizing them to the incoming stream of correlated signals which are stored in the channel profile memory, then conjugated and multiplied with the incoming correlation stream to produce a first output, which is accumulated and added to produce a rake combined output during a window. The rake combined output thereby includes signal power from all post-cursors and pre-cursors, thereafter using the accumulated output to make a decision on which value was received.

A third object of the invention is the generation of channel profile values from a stream of correlation peaks, each bounded by a window, whereby a channel profile memory having a length equal to said window is initialized, thereafter adding to the channel profile memory each stream of incoming correlation peaks during said window, the accumulation of data into the channel profile memory known as a training time, which is followed by a decision time, whereby said stream of correlation peaks is synchronized with said channel profile RAM, and the correlation peaks are multiplied by a complex conjugate of the contents of the channel profile memory, thereby accumulating the sum of all such multiplications during said window, and making a decision on the value of the symbol at the end of each said window.

SUMMARY OF THE INVENTION

During a training interval, a stream of baseband symbols from a wireless spread spectrum receiver is correlated with one or more codeword symbols into positive and negative correlation peaks. These correlation peaks are averaged into a channel profile Random Access Memory (RAM), and also generate a periodic window signal, during which window the pre-cursors and post-cursors for the present symbol are contained. After the training interval, a decision interval results in the contents of the channel profile RAM being conjugated and multiplied with the correlation peaks, producing a multiplier output. The multiplier output is fed to an accumulator, which initializes at the beginning of the window, and then adds each subsequent multiplier output during the window period, and finally is sampled at the end of the period to produce a decision output. This decision output includes the signal power from all the pre-cursors and post-cursors of the present codeword, and thereby provides a stream of decisions. The window interval may be chosen to allow approximately 20% precursors compared to the largest correlation signal, and 80% post-cursors, or any ratio of precursors and post-cursors which characterizes the operating condition of the receiver.

BRIEF DESCRIPTION OF THE DRAWINGS

FIG. 2 shows a prior art decision block for a direct sequence spread spectrum receiver.

FIG. 3 shows a waveform for a sliding correlator without multi-path reflections.

FIG. 4 shows the waveform for a sliding correlator with multi-path reflections.

FIG. 11b shows the I output of a sliding correlator operating at 11 Mhz when presented with the data of FIG. 11a.

FIG. 11c shows the Q output of a sliding correlator operating at 11 Mhz when presented with the data of FIG. 11a.

FIG. 11d shows the I output of a sliding correlator operating at 22 Mh when presented with the data of FIG. 11a.

FIG. 11e shows the Q output of a sliding correlator operating at 22 Mhz when presented with the data of FIG. 11a.

FIG. 11f show the I output of a sliding correlator operating at 22 Mhz when presented with multi-path reflections of the data of FIG. 11a.

FIG. 11g show the Q output of a sliding correlator operating at 22 Mhz when presented with multi-path reflections of the data of FIG. 11a.

FIGS. 12a and 12b show the waveforms for sliding correlator I and Q outputs with multi-path reflections.

FIGS. 12c and 12d show the waveforms for the window output and decision output of the training decision block during the training interval.

FIGS. 13a and 13b show the I and Q channel memory contents during the training period.

FIGS. 14a and 14b show the waveforms for the operation of the all-tap fractionally spaced serial combiner of FIG. 10.

DETAILED DESCRIPTION OF THE INVENTION

Figure 1:
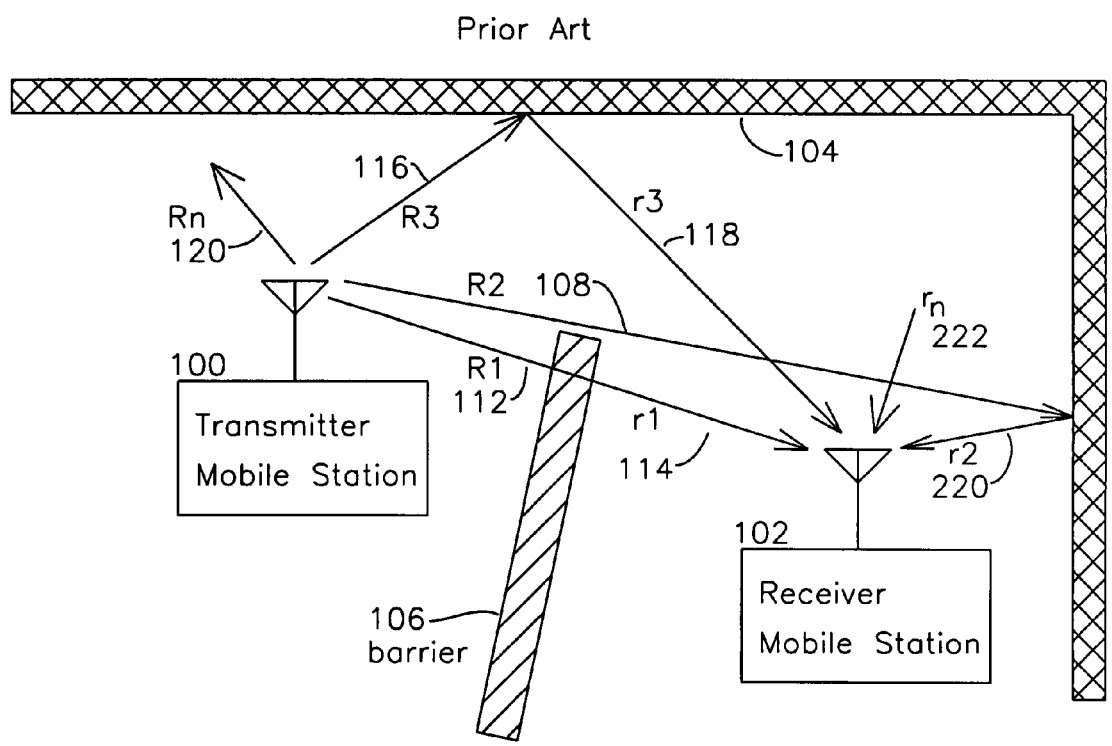
FIG. 1 shows a transmitter coupled to a receiver through a plurality of reception paths.
Figures 10, 10A:
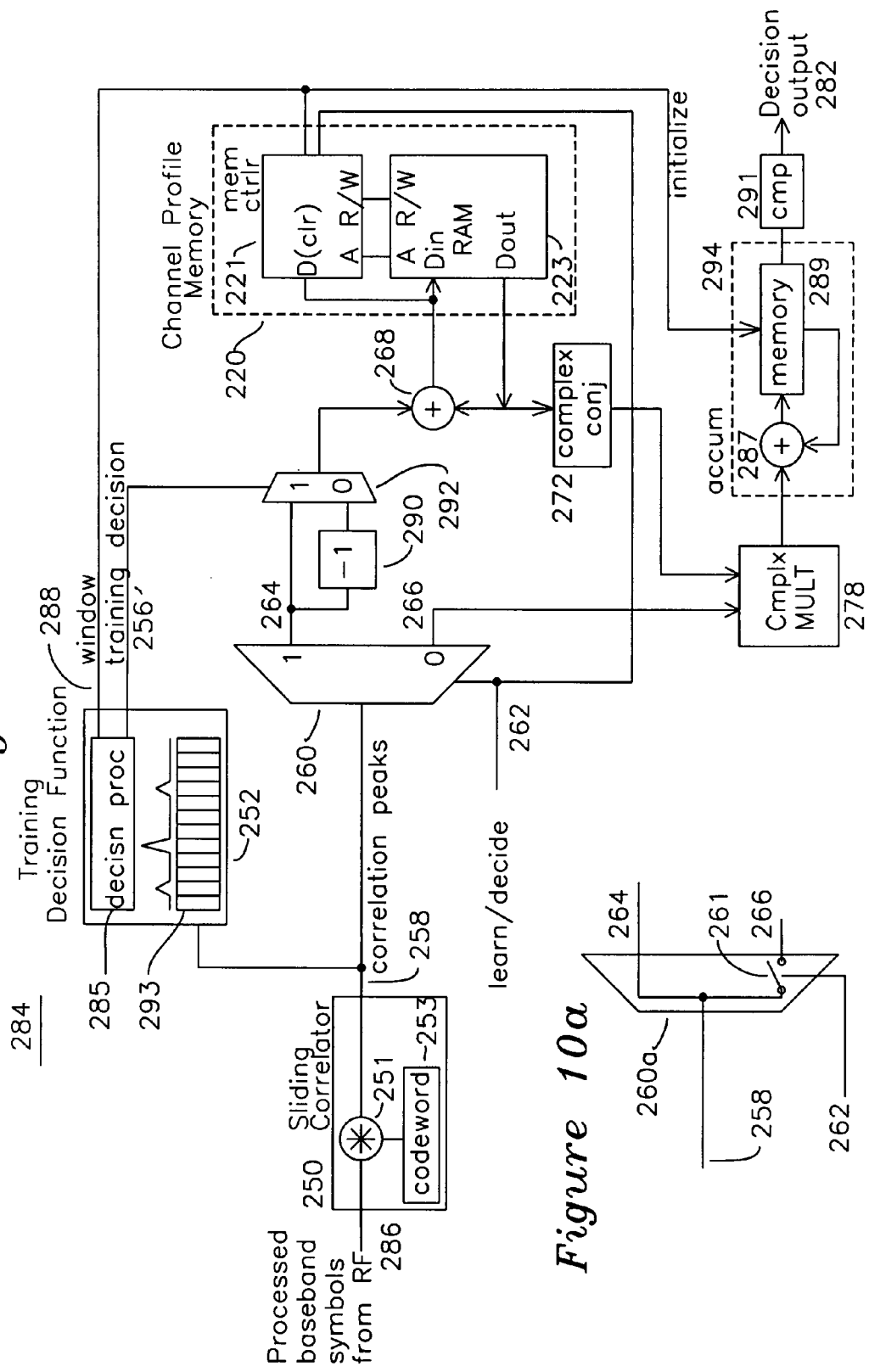
FIG. 10 shows the block diagram for an all-tap, fractionally-spaced serial rake combiner processor.
FIG. 10a shows an alternate function for the demultiplexer of FIG. 10.
Figure 11A:
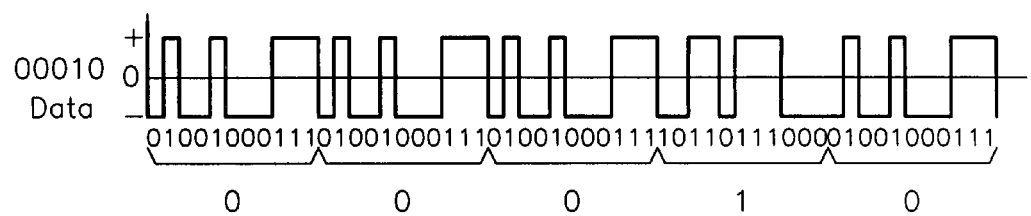
FIG. 11a shows the waveform for Barker chip codes for an 00010 data pattern.
Figure 11B:
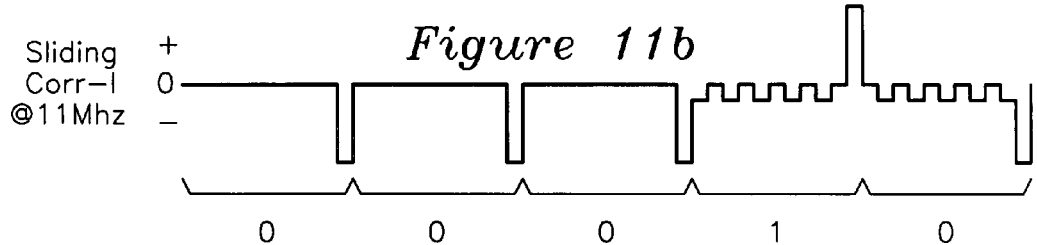
Figure 11C:
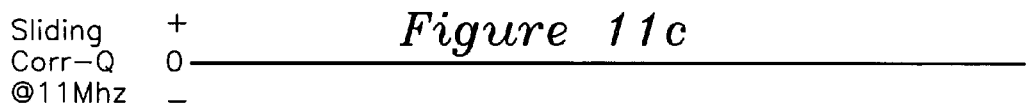
Figure 11D:
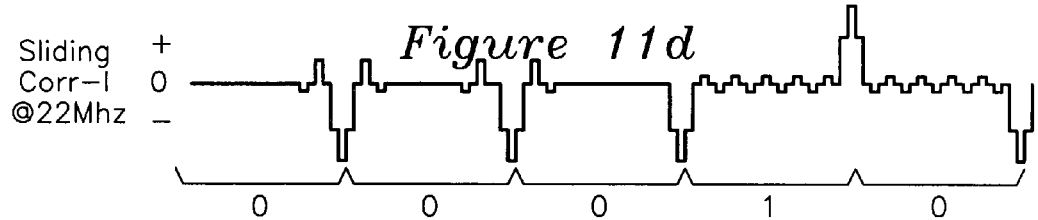
Figure 11E:
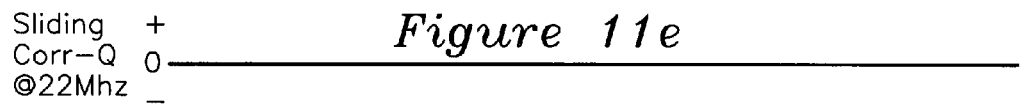
Figure 11F:
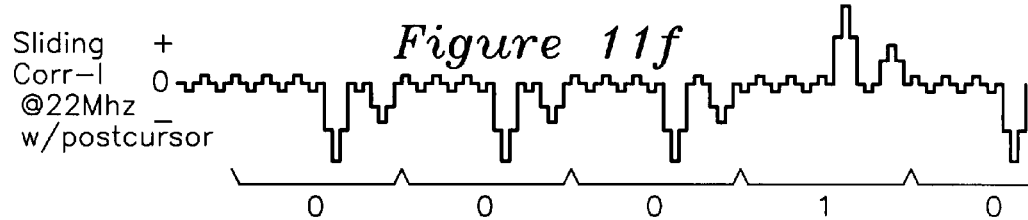
Figure 11G:
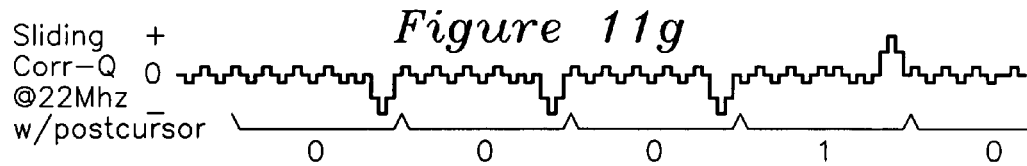

FIG. 10 shows an all-tap, fractionally-spaced serial rake combiner processor 284. Its operation is best understood in combination with the waveforms of FIGS. 11a through 11g. As with the maximal ratio combiners of FIGS. 5 and 6, a stream of incoming quadrature baseband symbols 286 comprising multi-valued I channel and a Q channel from the output of the baseband conversion radio frequency (RF) section (not shown) are provided to sliding correlator 250. Sliding correlator 250 then performs a complex cross-correlation 251 of the stream of incoming quadrature baseband symbols 286 with the I and Q Barker codewords 253 to produce a stream of correlation peaks 258. During a training interval which may occur during the preamble time of the received packet, these correlation peaks 258 are fed to a training decision function 252. This training decision function 252 then examines the previous samples of correlation peaks 258 by using a decision processor 285 to generate a window signal 288. This window signal 288 indicates the extent and framing of each codeword and decision signal, as well as a training decision output 256 which is a decision made on each codeword which is used during the training interval. The decision processor 285 may formulate a decision on the current codeword and codeword window by selecting the largest peak, and then framing the window function to allow for 20% precursors and 80% post-cursors about the largest peak. This may be similarly done with any other window function which includes pre-cursors and post-cursors. Decision processor 285 may use any other method known in the art of framing and synchronizing a multi-path received signal. Storage element 293 used in conjunction with decision processor 285 may rely on a single maximum value as a datum point for windowing pre-cursors and post-cursors, or it may store the entire received window of correlation output data for data analysis to determine the window signal. FIG. 11a shows the Barker codeword for 0 of 01001000111, and the Barker codeword for 1 of 10110111000, and the serial stream for data word 00010. The Barker codewords have the property of producing −1 when auto-correlated except for location 0 in auto-correlation, where they produces a maximum output of 11. Additionally, in a typical system, the individual 1s and 0s of each Barker codeword are received as amplitude values which include noise and multi-path reflections, and are represented as 6-8 bit values for the channels I and Q, as is commonly understood in digital signal processing. FIG. 11b shows the result of correlating the incoming symbol stream against the Barker codewords 01001000111 and 10110111000, for the I channel of the sliding correlator 250 of FIG. 10. A single position in the 11 bit sequence causes a positive peak for a 1, and a negative peak for a 0, thereby establishing a synchronization window and the value of the codeword. Since the incoming baseband RF is typically phase rotated to produce an output in the I channel, the Q channel shown in FIG. 11c is silent. In order to satisfy the Nyquist rate for sampling, the actual sampling speed is set to 22 Mhz, which is twice the bit rate of the symbols at 11 Mhz. Results of sampling at this rate are shown in FIGS. 11d and 11e in the absence of multi-path reflections. For a 1 Mb wireless data rate, the Barker codewords are carried only in the I channel, and for a 2 Mb data rate, the 11 bit codewords are carried simultaneously in the I and Q channels. The effect of multi-path reflections is phase rotation of the analytic baseband signal, so that some of the reflected energy from the I channel codewords may appear at a different time, and partially rotated into a different channel, as shown in FIGS. 11f and 11g. The larger amplitude reflection occurs in the same position as the pure reflection shown in FIGS. 11d and 11e, and a second reflection appears in the I and Q channels shown in FIGS. 11f and 11g. In terms relative to the largest amplitude signal within a window, signals which are part of the codeword that appear before the largest amplitude signal are called pre-cursors, and reflections which occur later are called post-cursors, as was described for FIG. 1.

FIGS. 12a and 12b show the 22 Mhz sampled I and Q channels in the presence of a single multi-path reflection, whereby the post-cursor occurs near the middle of the symbol window and appears in the I and Q channels. FIG. 12d shows the training decision output 256 of FIG. 10, which is centered within a window that includes a provision for pre-cursors and post-cursors. Since most of the signals which follow the strongest signal are post-cursors, it is acceptable to define the window to include 5-10% pre-cursors, and 90-95% post-cursors from the largest sliding correlator output, as shown in FIG. 12a.

FIG. 13a shows the contents of the channel profile memory 220 from FIG. 10 during the training interval. In FIG. 10, the channel profile memory 220 comprises memory 223 and memory controller 221. During the initial part of the training interval, the D(clr) output of memory controller 221 is asserted to the Din of memory 223. At the same time, the read/write (R/W) signal is asserted as the write and addresses (A) are cycled, thereby writing a 0 value into all locations. In this manner, the contents of memory 223 are initialized at the beginning of the training sequence using the learn/decide signal 262. The channel profile memory 220 comprises a number of locations equal to the number of samples in a codeword window. For a 22 Mhz sampling rate and 11 bit symbols, the channel profile memory 220 comprises 22 locations for each I and Q channel. The channel profile memory may have from 2 to 20 samples of data where 6 bit data is collected and accumulated. The width of each I and Q channel location depends on the number of samples and size of each sample to be added. In general, the memory 223 width is $d+\log_2(n)$, where n is the number of averages, or number of times the training values are added in, and d is the intrinsic sample resolution of the correlation peaks 258. The contents of the memory 223 may be truncated to a lower number of bits for economy. Initially, the contents of the channel profile memory 223 is cleared as described earlier, and once the training decision block determines a suitable window, the channel profile memory controller 221 synchronizes the storage of correlation peaks 258 with this window. When the correlation peaks 258 contain a codeword that the training decision indicates is the Barker 1 codeword 10110111000, this correlation sequence is added directly to the channel profile memory 220 as a complex value. When the Barker 0 codeword of 01001000111 is received, this value is inverted and added to the channel profile memory 220. This is done for perhaps 20 cycles synchronized with each window, each time adding the current correlation peaks 258 to the previous correlation peaks already present in memory 223. Each additional cycle produces a growing value for the I channel of the channel profile memory 220 as shown in FIG. 13a and for the Q channel of the channel profile memory 220 as shown in FIG. 13b. In this manner, the channel profile memory 220 in FIG. 10 contains the correlation peaks associated with the average channel response over the training interval, and each new correlation peak is synchronized and added to the previous correlation peak.

After the training interval, the demultiplexer 260 in FIG. 10 delivers no additional codewords to the channel profile memory, and the memory controller 221 prevents additional data from being written using learn/decide signal 262. The contents of channel profile memory 223 are sequentially read by memory controller 221 in synchronism with the incoming correlation peaks using window signal 288. The contents of channel profile memory 223 which are now synchronized with the incoming correlation peaks 258, are conjugated by complex conjugator 272. This conjugation nullifies the channel effects due to varying phase of the reflected signals. This conjugation changes the sign of the imaginary part of the complex contents of memory 223. The output of the complex conjugator 272 is multiplied with the correlation peaks 258 within complex multiplier 278. These aforementioned correlation peaks 258 are selected by the demultiplexer 260 using the learn/decide signal 262, and the multiplier 278 output is delivered to an accumulator 294. The memory 289 within the accumulator 294 is initialized at the beginning of the window signal 288, and incoming multiplier output values are summed with the present value of memory 289 using adder 287. At the end of the window as indicated by signal 288, the values of the I and Q channels of the accumulator are examined. Since the pre-cursors and post-cursors have been added into these resulting values for I and Q, the resulting contents of memory 289 is then compared 291 with a threshold(0) to determine if the value is 1 or 0 in each of the I and Q channels. In this manner, the accumulations of all pre-cursors and post-cursors in the window belonging to a particular codeword are provided to the I and Q channel outputs, and a decision is made on these symbols. The ability to make a decision on these symbols generated in the described manner has reduced complexity and increased performance compared to prior art solutions.

Figure 5:
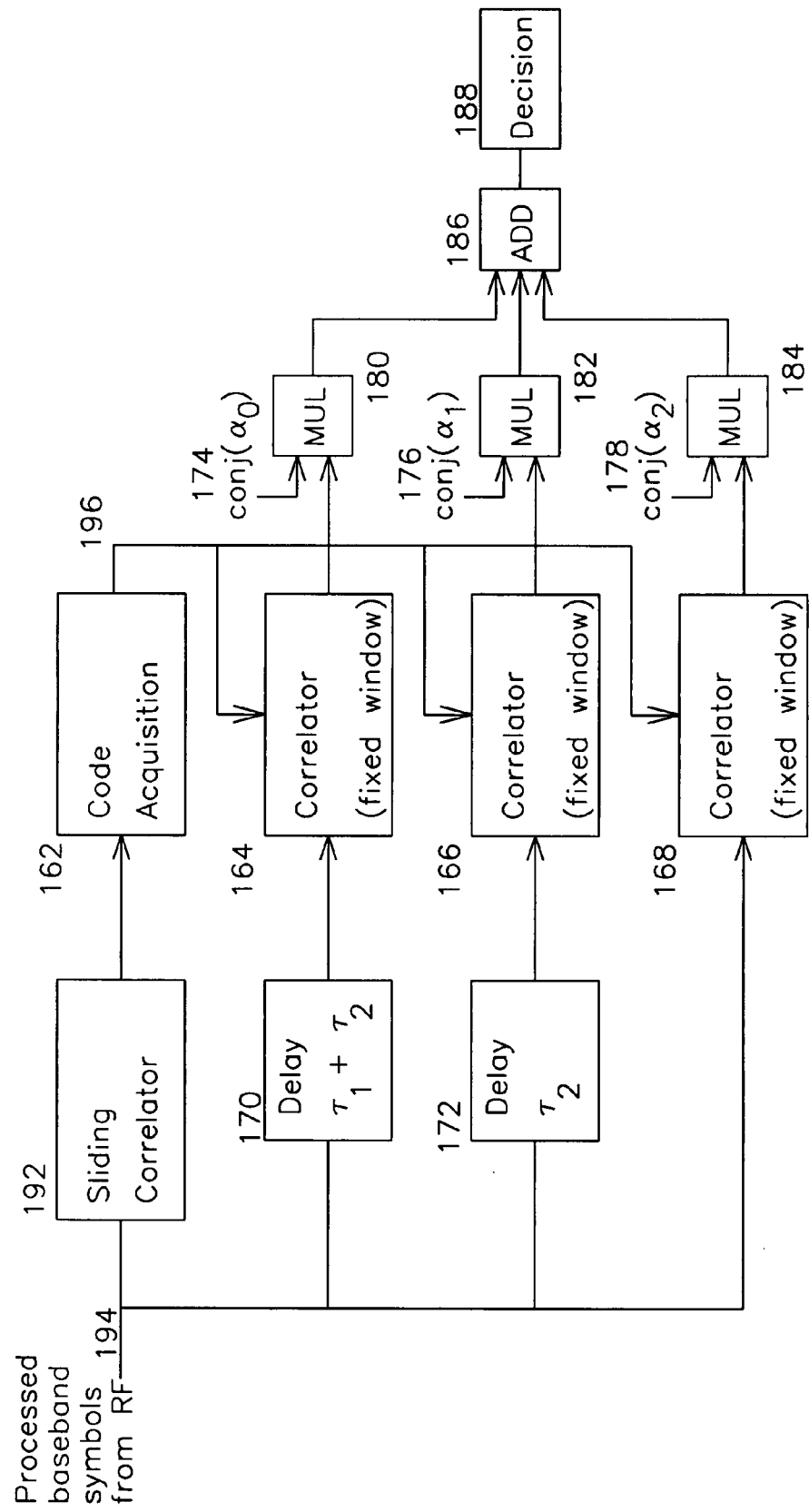
FIG. 5 shows the block diagram for rake combining signal processing system, a type of maximal ratio combiner, with a plurality of fixed-window correlators.
Figure 6:
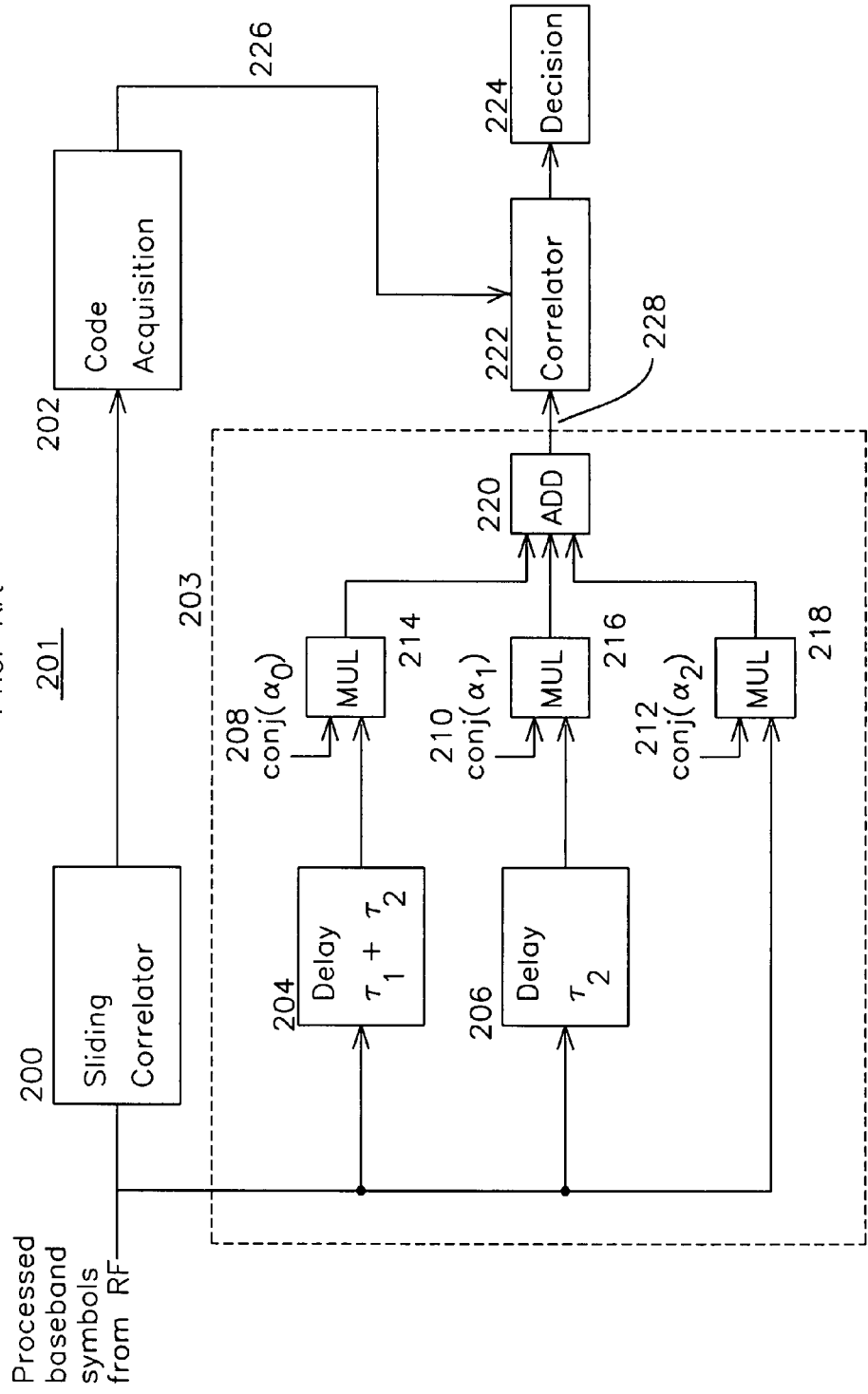
FIG. 6 shows the block diagram for a maximum ratio combiner as an FIR filter before a single fixed window correlator.
Figure 7:
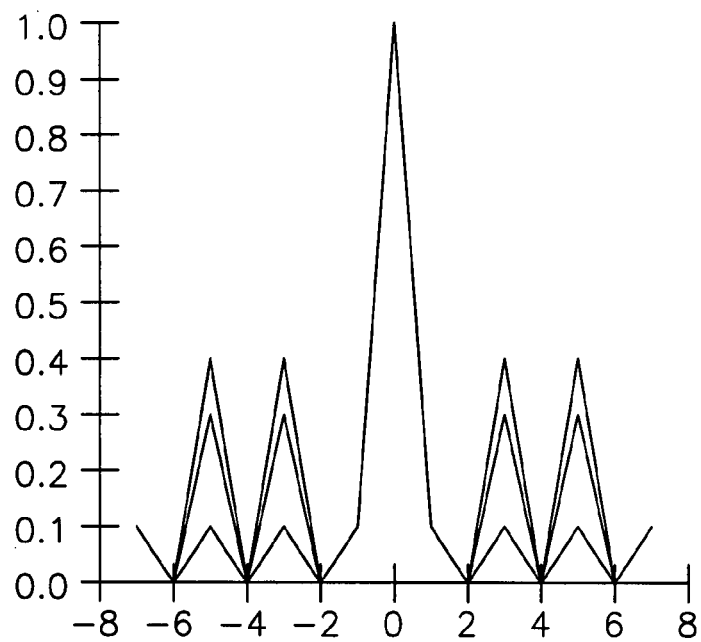
FIG. 7 shows the waveform for the normalized, time-shifted cross correlation output for complementary code keying (CCK) codewords.
Figure 8:
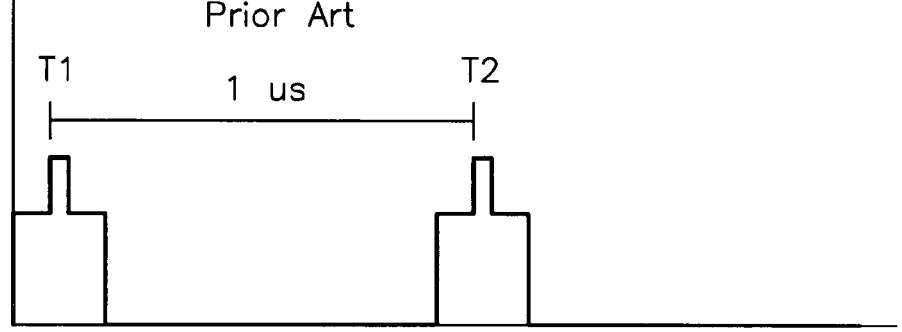
FIG. 8 shows the waveform for the sliding correlation output for Barker codewords.
Figure 9:
FIG. 9 shows the waveform for the sliding correlation output for noise input.

Comparing the functionality and complexity of the combiner of FIG. 10 to the prior art of FIG. 5 or 6, a clear reduction in complexity has been achieved with no loss in functionality. The various delayed signals enter FIG. 5 input 194, and a plurality of separate delays and multiplication coefficients are calculated, conjugated, multiplied, and summed to the final result. A full implementation of the signal processor 190 on a 22 sample per symbol incoming rate would require 22 such channels, each with a complex multiplier. Typically, a much smaller number of channels are implemented, such as the 3 shown in FIGS. 5 & 6, and these channels operate on a few large signals which are selected for phase correction. The decision 188 is made on this small number of signals. In the present invention shown in FIG. 10, all of the signal reflections are contained in the channel profile memory 220 of FIG. 10, and each sample interval, a current channel memory content value is conjugated, multiplied by incoming correlation peaks 258, and summed in accumulator 294. In this manner, every sample is used to produce the final accumulated result stored in memory 289, in contrast with the finite number of delay paths associated with FIG. 5 or 6. For a system of FIG. 5 or 6 to achieve this performance at 22 samples per symbol, 22 delay elements (170 and 172) and 22 multipliers (180, 182, and 184) would be required. The system of FIG. 10 achieves this same functionality with a single multiplier 278. The reference to the present invention as an "all-tap" combiner makes reference to the equivalent functionality of a 22 tap FIR filter 203 of FIG. 6 being achieved in the single multiplier circuit of FIG. 10.

An additional advantage of the present invention compared to the prior art of FIG. 5 or 6 is simplified circuitry allows operation at twice the incoming sample rate. The incoming 11 Mbps data stream may be sampled at 22 Mhz as presented in the data stream 286 of FIG. 10. The peaks of the correlator outputs in 1 us duration are used to create the channel profile, which is averaged over many cycles to reduce the noise content. When the channel profile memory contents are multiplied by the incoming data stream at 22 Mhz, the phase offsets associated with initial timing offsets are cancelled. If the rake training is continued throughout the packet such that the channel memory 220 continues to add new correlation peak data 258 over the duration of packet reception, as opposed to stopping the learning process after the preamble, the need for a timing-tracking loop (not shown) to track drifts between the transmitter oscillator (not shown) and received data clock is eliminated, as the slow phase change of the incoming data is compensated by the slow phase change of the contents of the channel profile memory.

FIG. 10a shows the alternate functionality, where the incoming correlation peaks 258 are delivered to multiplexer 280a, which always sends the peaks to channel profile memory 264, and the memory controller 221 of FIG. 10 is always adding incoming data to the channel profile memory 223, regardless of the state of learn/decide signal 262, which now controls switch 261, enabling data to the complex multiplier 278 when the learn/decide signal 262 is in the decide state. As both the channel profile memory and incoming data slowly rotate in phase together because of slow drifts in clock, the result of conjugation and multiplication of the channel profile memory with the incoming correlation peaks is the rotation of the multiplication product back into the correct I and Q channels.

Figure 14A:
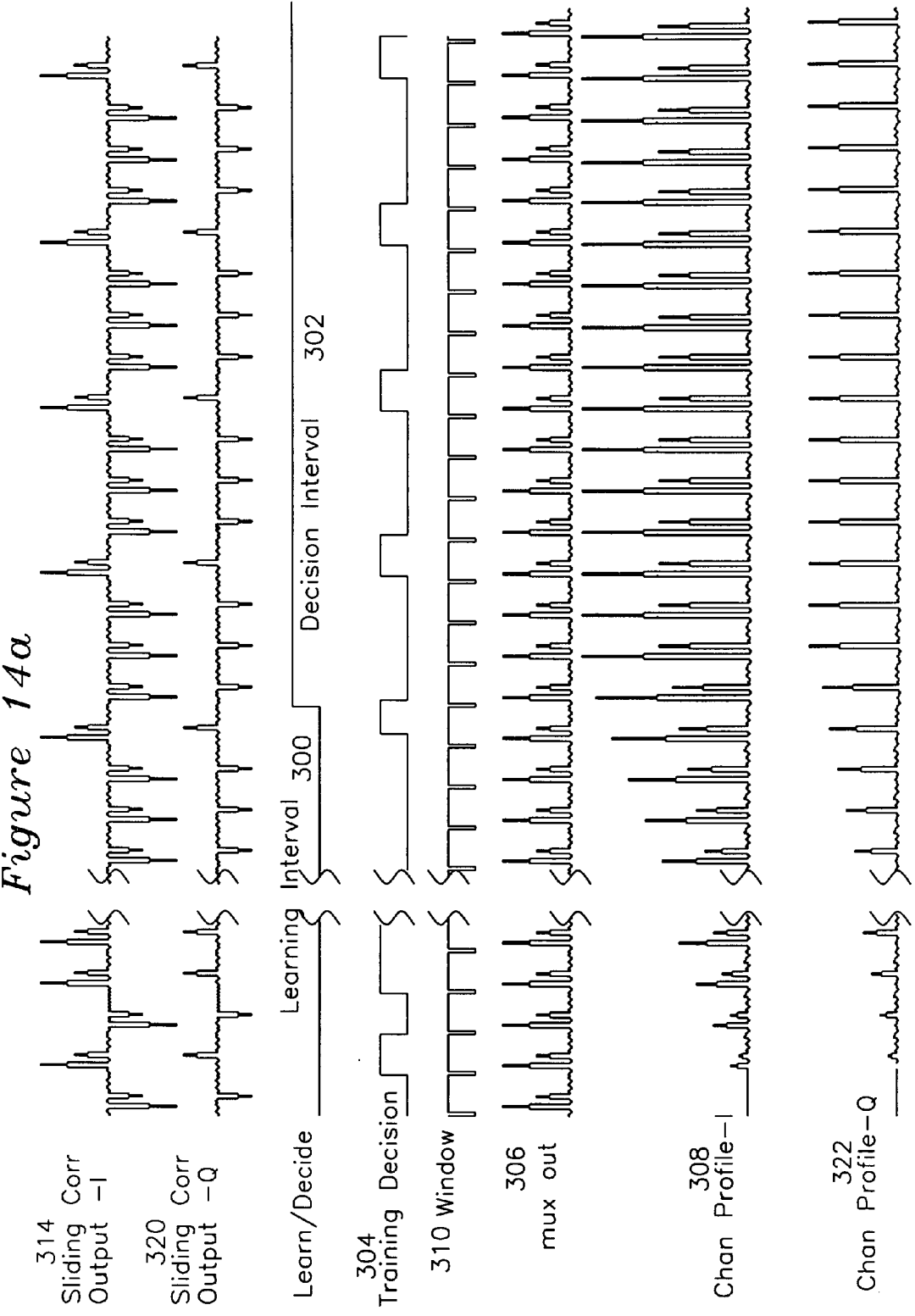

FIGS. 14a and 14b show the overall operation of the all-tap, fractionally-spaced serial rake combiner processor 284 in FIG. 10. In FIGS. 14a and 14b, learning interval 300 is followed by a decision interval 302. During the learning interval 300, sliding correlator outputs 1314 and Q 320 are generated by sliding correlator 250 of FIG. 10, and then as also shown in FIG. 10, training decision function 252 generates training decision output 256 and window signal 288. When the training decision output 256 of FIG. 10 which is illustrated by the waveform 304 of FIG. 14a is 1, multiplexer 292 selects the correlation peaks 258 through demultiplexer 260. When the training decision output 256 is 0, the correlation peak values are inverted with inverter 290 during the duration of the window signal 288, and inverted values are selected through multiplexer 292. In this manner, same-polarity symbols including multi-path reflections are successively added into the channel profile memory 220 using adder 268 of FIG. 10. Waveform 306 of FIG. 14a shows the same-polarity training multiplexer output found at the multiplexer 292 of FIG. 10. This same-polarity training multiplexer output is either the original sliding correlator output when the training decision 304 is 1, or the negated value when the training decision 304 is 0. Waveform 308 of FIG. 14a shows the contents of channel profile memory 220 of FIG. 10, which initialize to 0 at the start of the training interval, and grow with each successive addition 268 from the multiplexer 292. This multiplexer 292 output is illustrated in waveform 306 of FIG. 14a. At the end of the learning interval 300 of FIG. 14a, the channel profile memory 220 of FIG. 10 has the additive contribution of signals from each cycle, while the random noise component tends to average out. This averaging thereby achieves an improved signal to noise version of the correlation peak to use as a template during the resulting decision interval 302 of FIG. 14a.

FIG. 14b shows the contents of channel profile memory 220 of FIG. 10 during the learning interval 300 illustrated by waveform 308/322. During the learning interval 300, the window waveform 310 is used by the channel profile memory controller 221 of channel profile memory 220 to establish synchronization between incoming data from multiplexer 292 and training window data stored in channel profile memory. During decision interval 302, window waveform 310 defines the boundaries of each codeword and indicates the beginning and end of each accumulator 294 of FIG. 10 window. The window 310 and training decision 304 waveforms are asserted at the earliest point that the training decision function 252 of FIG. 10 is able to ascertain the largest signal to use as a datum reference, as was described earlier. The output of the complex multiplier 278 of FIG. 10, is illustrated by waveform 322 of FIG. 14b. Waveform 322 shows the result of multiplying the incoming sliding correlator output 314/210 by the complex conjugate of the channel profile memory waveform 308 of FIG. 14a. The window signal 288 of FIG. 10 and window waveform 310 of FIG. 14a have been centered by the training decision function 252 of FIG. 10 about the strongest correlation peak to include some pre-cursors, and the majority of post-cursors. This window waveform 310 of FIG. 14a is used to reset the accumulator 294 of FIG. 10 at the beginning of each window. After the multiplier output values are accumulated during the acquisition window, the value is sampled at the end of the acquisition window and a decision is made, as shown in the decision values of waveform 324 of FIG. 14b. This accumulation and sampling operation is performed on the I and Q channels of the accumulator 294 of FIG. 10.

As the result of the aforementioned process, a decision can be made from a stream of quadrature input signals which conform to the IEEE 802.11b wireless data rates of 1 Mb and 2 Mb comprising Barker codes. It is clear to one skilled in the art of digital signal processing and wireless encoding systems that the steps of training a channel profile memory require the Barker code for 0 be inverted compared to the value of the Barker code for 1. Within the system described, it is possible to do this for the I and Q channels, thereby collecting an averaged Barker codeword for the channel. The system described comprises, as illustrated in FIG. 10, a sliding correlator 250 for the recovery of codewords which may include reflected codewords and a training decision function 252 for generation of a window signal for framing the codewords. The system also includes a training decision output 256 for determining whether the codeword for 0 or 1 was sent to accumulate same-polarity symbols into the channel profile memory 220, which contains a sum of responses.

We claim:

1. A combiner processor comprising:
    a sliding correlator for correlating a serial stream of baseband symbols against a first codeword and forming a correlation peak output;
    a training decision function coupled to said correlation peak output and generating a window output that is asserted at the start of an interval and unasserted at the end of said interval and also a training decision output;
    a demultiplexer coupled to said correlation peak output and having a learn control input whereby when said demultiplexer learn control input is asserted:
    said correlation peak output is coupled to a channel profile memory such that said correlation peak output is added to the contents of said channel profile memory when said training decision output is true and said correlation peak output is inverted and added to the contents of said channel profile memory when said training decision output is false;
    and when said demultiplexer learn control input is not asserted:
    said correlation peak output is multiplied with the complex conjugate of the contents of said channel profile memory and coupled to an accumulator which adds said multiplier result when said window output is asserted and generates a decision output when said window output is unasserted.

2. The combiner processor of claim 1 wherein said first codeword is 11 bits.

3. The combiner processor of claim 1 where said first codeword is a Barker codeword.

4. The combiner processor of claim 1 wherein said first codeword is {+1, −1, +1, +1, −1, +1, +1, +1, −1, −1, −1}.

5. The combiner processor of claim 1 wherein said first codeword is {−1, +1, −1, −1, +1, −1, −1, −1, +1, +1, +1}.

6. The combiner processor of claim 1 wherein said serial stream of baseband symbols includes Barker codewords.

7. The combiner processor of claim 1 wherein said serial stream of baseband symbols includes an in-phase component and a quadrature component.

8. The combiner processor of claim 7 wherein said serial stream of quadrature symbols includes an I channel and a Q channel.

9. The combiner processor of claim 7 wherein said serial stream of quadrature phase symbols includes an I channel and a Q channel.

10. The combiner processor of claim 9 wherein said complex conjugate comprises negating the value of said Q channel.

11. The combiner processor of claim 1 wherein said training decision function window output is asserted for a duration substantially equal to the duration of said codeword.

12. The combiner processor of claim 1 wherein said training decision function window output is asserted when pre-cursor symbols are arriving prior to the largest said correlation peak in said window output asserted duration.

13. The combiner processor of claim 1 wherein said training decision function window includes post-cursor symbols arriving after the largest said correlation peak in said window output asserted duration.

14. The combiner processor of claim 1 wherein said training decision output indicates which said codeword was received during said window output asserted duration.

15. The combiner processor of claim 1 wherein said demultiplexer learn input is asserted during a first interval.

16. The combiner processor of claim 15 wherein said first interval occurs during the preamble of a received packet.

17. The combiner processor of claim 15 wherein said first interval is greater than 10 said codeword symbols.

18. The combiner processor of claim 1 wherein said baseband symbols have an in-phase component and a quadrature component and said complex conjugate comprises negating the value of said quadrature component.

19. The combiner processor of claim 1 wherein said channel profile memory is synchronized to said training decision function window output.

20. The combiner processor of claim 1 wherein said channel profile memory comprises a random access memory and a memory controller coupled to said random access memory.

21. The combiner processor of claim 1 wherein said correlation peak output has an in-phase component and a quadrature component, and said channel profile memory has associated in-phase storage and quadrature storage such that said correlation peak output in-phase component is added to said in-phase storage and said correlation peak output quadrature component is added in said quadrature storage when said demultiplexer learn input is asserted.

22. The combiner processor of claim 1 wherein said channel profile memory is initialized when said demultiplexer learn control input is first asserted.

23. The combiner processor of claim 1 wherein said channel profile memory has a number of locations equal to the number of samples in said codeword.

24. The combiner processor of claim 1 wherein said accumulator includes a memory which is initialized at the start of each said window.

25. The combiner processor of claim 1 wherein said accumulator includes a memory and an adder which adds the current said multiplier output to said memory contents.

26. The combiner processor of claim 1 wherein said decision output compares said accumulated value against a threshold at the end of said window.

27. The combiner processor of claim 26 wherein said threshold is 0.

28. The combiner processor of claim 26 wherein said threshold is 0.

29. The combiner processor of claim 1 wherein said codewords are used for direct sequence spread spectrum communications.

30. A combiner processor having two states:
a training state whereby a serial stream of baseband symbols is correlated against a first codeword, thereby producing a correlation peak output, said correlation peaks examined by a training decision function to generate a window output indicating the extent of said symbol and a decision output which is either true or false, said correlation peaks added to a channel profile memory when said decision output is true and inverted and added to said channel profile memory when said decision output is false;
a decision state whereby said correlation peak output is multiplied by the complex conjugate of the contents of said channel profile memory to produce a multiplier output;
an accumulator coupled to said multiplier output wherein said accumulator is reset at the start of said window, accumulates the output of said multiplier during said window, and generates a binary output value at the end of said window.

31. The combiner processor of claim 30 wherein said first codeword is 11 bits.

32. The combiner processor of claim 30 wherein said first codeword is a Barker codeword.

33. The combiner processor of claim 30 wherein said first codeword is {+1, −1, +1, +1, −1, +1, +1, +1, −1, −1, −1}.

34. The combiner processor of claim 30 wherein said first codeword is {−1, +1, −1, −1, +1, −1, −1, −1, +1, +1, +1}.

35. The combiner processor of claim 30 wherein said serial stream of baseband symbols includes Barker codewords.

36. The combiner processor of claim 30 wherein said serial stream of baseband symbols is two streams of symbols in quadrature phase.

37. The combiner processor of claim 36 wherein said serial stream of quadrature phase symbols includes an I channel and a Q channel.

38. The combiner processor of claim 37 wherein said complex conjugate comprises negating the value of said Q channel.

39. The combiner processor of claim 30 wherein said training decision function window output has a duration equal to the duration of said codeword.

40. The combiner processor of claim 30 wherein said training decision function window output includes pre-cursor symbols arriving prior to the largest said correlation peak in said window.

41. The combiner processor of claim 30 wherein said training window includes post-cursor symbols arriving after the largest said correlation peak in said window.

42. The combiner processor of claim 30 wherein said training decision output indicates which said codeword was received during said window.

43. The combiner processor of claim 30 wherein said training state occurs during a first interval.

44. The combiner processor of claim 43 wherein said first interval occurs during the preamble of a received packet.

45. The combiner processor of claim 43 wherein said first interval is greater than 10 said codeword symbols.

46. The combiner processor of claim 30 wherein said channel profile memory is synchronized to said training decision function window output.

47. The combiner processor of claim 30 wherein said channel profile memory comprises a random access memory and a memory controller coupled to said random access memory.

48. The combiner processor of claim 30 wherein said channel profile memory adds quadrature said correlation peak output when said demultiplexer learn input is asserted.

49. The combiner processor of claim 30 wherein said channel profile memory is initialized at the beginning of said training state.

50. The combiner processor of claim 30 wherein said channel profile memory has a number of locations equal to the number of samples in said codeword.

51. The combiner processor of claim 30 wherein said accumulator includes a memory which is initialized at the start of each said window.

52. The combiner processor of claim 30 wherein said accumulator includes a memory and an adder which adds the current said multiplier output to said memory contents.

53. The combiner processor of claim 30 wherein said binary output compares said accumulated value against a threshold at the end of said window.

54. The combiner processor of claim 53 wherein said threshold is 0.

55. The combiner processor of claim 30 wherein said decision state occurs during a second interval.

56. The combiner processor of claim 30 wherein said codewords are used for direct sequence spread spectrum communications.

57. A process for generating a decision output from a serial stream of baseband symbols, said process comprising:
a first learning step comprising:
correlating said incoming serial stream with one or more codewords to generate a correlation output, examining said correlation output to generate a training decision which is positive or negative, and also generating a window signal indicating the start and end of said incoming serial symbols, said incoming symbols added to the contents of a channel profile memory when said training decision is positive, and inverting said incoming symbols and adding to the contents of said channel profile memory when said training decision is negative;
a second decision step comprising:
multiplying said correlation peaks with the complex conjugate of said channel profile memory contents, thereby forming a multiplier output and accumulating said multiplier output during said window signal start time to said window signal end time to form a decision value, and comparing said decision value at the said window signal end time to form said decision output.

58. The process of claim 57 wherein said first codeword is 11 bits.

59. The process of claim 57 wherein said first codeword is a Barker codeword.

60. The process of claim 57 wherein said first codeword is {+1, −1, +1, +1, −1, +1, +1, +1, −1, −1, −1}.

61. The process of claim 57 wherein said first codeword is {−1, +1, −1, −1, +1, −1, −1, −1, +1, +1, +1}.

62. The process of claim 57 wherein said serial stream of baseband symbols includes Barker codewords.

63. The process of claim 57 wherein said serial stream of baseband symbols has quadrature phase separation.

64. The process of claim 57 wherein said window output has duration equal to the duration of said codeword.

65. The process of claim 57 wherein said window output includes pre-cursor symbols arriving prior to the largest said correlation peak in said window.

66. The process of claim 57 wherein said window includes post-cursor symbols arriving after the largest said correlation peak in said window.

67. The combiner processor of claim 57 wherein said training decision output indicates which said codeword was received during said window.

68. The process of claim 57 wherein said learning step precedes said decision step.

69. The process of claim 57 wherein said learning step occurs during the preamble of a received packet.

70. The process of claim 57 wherein said learning step uses more than 10 said codeword symbols.

71. The process of claim 57 wherein said channel profile memory is synchronized to said window.

72. The process of claim 57 wherein said channel profile memory comprises a random access memory and a memory controller coupled to said random access memory.

73. The process of claim 57 wherein said correlation output has an in-phase component and a quadrature component, and said channel profile memory has in-phase storage and quadrature storage such that said correlation output in-phase component is added to said in-phase storage and said correlation output quadrature component is added to said quadrature storage during said learning step.

74. The process of claim 57 wherein said channel profile memory is initialized at the beginning of said learning step.

75. The process of claim 57 wherein said channel profile memory has a number of locations equal to the number of samples in said codeword.

76. The process of claim 57 wherein said accumulation includes a memory which is initialized at the start of each said window.

77. The process of claim 57 wherein said accumulation includes a memory and an adder which adds the current said multiplier output to said memory contents.

78. The process of claim 57 wherein said decision value compares said accumulated value against a threshold at the end of said window.

79. The process of claim 57 wherein said codewords are used for direct sequence spread spectrum communications.

80. A combiner processor comprising:
a sliding correlator for correlating a serial stream of baseband symbols against a first codeword and forming a correlation peak output;
a training decision function coupled to said correlation peak output and generating a window output that is asserted during an interval, and unasserted at other times, the training decision function also generating a training decision output;
said correlation peak output is coupled to a channel profile memory such that said correlation peak output is added to said channel profile memory when said training decision output is true and said correlation peak output is inverted and added to said channel profile memory when said training decision output is false; and
a decision control input whereby when said decision control input is asserted, said correlation peak output is multiplied with the complex conjugate of said channel profile memory and coupled to an accumulator which adds said multiplier result when said window output is asserted and generates a decision output when said window output is unasserted.

81. The combiner processor of claim 80 wherein said first codeword is 11 bits.

82. The combiner processor of claim 80 wherein said first codeword is a Barker codeword.

83. The combiner processor of claim 80 wherein said first codeword is {+1, −1, +1, +1, −1, +1, +1, +1, −1, −1, −1}.

84. The combiner processor of claim 80 wherein said first codeword is {−1, +1, −1, −1, +1, −1, −1, −1, +1, +1, +1}.

85. The combiner processor of claim 80 wherein said serial stream of baseband symbols includes Barker codewords.

86. The combiner processor of claim 80 wherein said serial stream of baseband symbols is two streams of symbols in quadrature phase.

87. The combiner processor of claim 80 wherein said serial stream of quadrature symbols includes an I channel and a Q channel.

88. The combiner processor of claim 87 wherein said complex conjugate comprises negating the value of said Q channel.

89. The combiner processor of claim 80 wherein said training decision function window output has duration equal to the duration of said codeword.

90. The combiner processor of claim 80 wherein said training decision function window output duration of assertion includes pre-cursor symbols which arrive prior to the largest said correlation peak in said window output asserted duration.

91. The combiner processor of claim 80 wherein said training decision function window output duration of assertion includes post-cursor symbols arriving after the largest said correlation peak in said window output asserted duration.

92. The combiner processor of claim 80 wherein said training decision output indicates which said codeword was received during said window output asserted duration.

93. The combiner processor of claim 80 wherein said decision input is not asserted during a first interval.

94. The combiner processor of claim 93 wherein said first interval occurs during the preamble of a received packet.

95. The combiner processor of claim 93 wherein said first interval is greater than 10 said codeword symbols.

96. The combiner processor of claim 80 wherein said channel profile memory is synchronized to said training decision function window output asserted duration.

97. The combiner processor of claim 80 wherein said channel profile memory comprises a random access memory and a memory controller coupled to said random access memory.

98. The combiner processor of claim 80 wherein said channel profile memory has an in-phase part and a quadrature part, and said combiner processor adds an in-phase component of said correlation peak output to said in-phase channel profile memory and also adds a quadrature phase component of said correlation peak output to said channel profile memory quadrature part.

99. The combiner processor of claim 80 wherein said channel profile memory is initialized.

100. The combiner processor of claim 80 wherein said channel profile memory has a number of locations equal to the number of samples in said codeword.

101. The combiner processor of claim 80 wherein said accumulator includes a memory which is initialized at the start of each said window output assertion.

102. The combiner processor of claim 80 wherein said accumulator includes a memory and an adder which adds the current said multiplier output to said memory contents.

103. The combiner processor of claim 80 wherein said decision output compares said accumulated value against a threshold at the end of said window output assertion.

104. The combiner process of claim 103 wherein said threshold is 0.

105. The combiner processor of claim 80 wherein said codewords are used for direct sequence spread spectrum communications.

* * * * *

UNITED STATES PATENT AND TRADEMARK OFFICE
CERTIFICATE OF CORRECTION

PATENT NO. : 7,298,799 B1
APPLICATION NO. : 10/795817
DATED : November 20, 2007
INVENTOR(S) : Narasimhan Venkatesh et al.

It is certified that error appears in the above-identified patent and that said Letters Patent is hereby corrected as shown below:

Column 12, line 5 "sliding correlator outputs 1314 and" should be changed to --sliding correlator outputs I 314 and--

Signed and Sealed this

Eighth Day of September, 2009

David J. Kappos
*Director of the United States Patent and Trademark Office*